Patented Nov. 1, 1932

1,885,449

UNITED STATES PATENT OFFICE

DAVID CLARENCE RHYS JONES, OF POLMONT, SCOTLAND, ROBERT FRASER THOMSON, OF CARLISLE, ENGLAND, AND JOHN THOMAS, OF POLMONT, SCOTLAND, ASSIGNORS TO IMPERIAL CHEMICAL INDUSTRIES LIMITED, A CORPORATION OF GREAT BRITAIN

COLORING MATTERS AND INTERMEDIATES OF THE BENZANTHRONE SERIES

No Drawing. Application filed March 26, 1931, Serial No. 525,608, and in Great Britain April 1, 1930.

This invention relates to the preparation and use of coloring matters and intermediates of the benzanthrone series. It relates especially to a process for the preparation of coloring matters and intermediates from bodies obtainable by treating benzanthrone compounds with formaldehyde, said bodies having the probable formula

wherein B represents a benzanthronyl radical and R is selected from the group consisting of hydrogen, alkyl and aryl.

We have found that the substances which are obtainable by treating benzanthrone with formaldehyde in the presence of condensing agents such as sulphuric acid and which may be dibenzanthronyl methanes or related substances, can be made to give new and valuable products by treatment with acyl halides or anhydrides, especially aromatic acid halides or anhydrides, in the presence of aluminium chloride, with or without oxidizing agents such as gaseous oxygen. According to the proportions of the starting materials used, and to the duration of the heating, the temperature and other conditions of treatment, different bodies may be prepared of special interest for the preparation of alkali soluble bodies.

The bodies prepared by our process may be treated with oxidizing agents such as sodium hypochlorite and they may, if desired, be submitted, either before or after treatment, to further treatment, such as alkylation or acylation. Any or all of the above processes may be carried out, where desired, in the presence of suitable solvents or diluents. We have found that the substances obtainable according to our invention are valuable in part as intermediates and in part as coloring matters for the production of new dyed and colored materials. The coloring matters are used either as pigments or, for example, as vat dyes, or as direct dyes for cellulose acetate or similar materials.

We have found, for instance, that the process which consists of treating the condensation product from benzanthrone and formaldehyde in sulphuric acid, with benzoyl chloride, aluminium chloride, sodium chloride and an oxidizing agent gives a new bright yellow product soluble in alkali.

The invention is illustrated but not limited by the following examples, in which the parts are by weight:

*Example 1*

This describes the production of one of the starting materials from benzanthrone and formaldehyde. 50 parts of benzanthrone are dissolved in 734 parts of 90% sulphuric acid and allowed to cool. 271 parts of 37% formaldehyde are then slowly added with stirring. The temperature is raised to 80° C. and maintained at this for 2¼ hours. The product is precipitated and poured into 60–65% sulphuric acid, is filtered and washed.

*Example 2*

15 parts of the product of Example 1, 150 parts of anhydrous aluminium chloride, 30 parts of sodium chloride and 75 parts of benzoyl chloride are intimately mixed and heated at 140° C. for about 40 hours while oxygen is bubbled through. After cooling, the mass is boiled out with water and hydrochloric acid and then heated at 90° C. with bleach liquor. The product is a very bright orange powder completely soluble in dilute alkali and is obtained in good yield. It dissolves in concentrated sulphuric acid giving a deep red color and dyes cotton in yellow shades from a brownish-red vat. It also dyes wool from a faintly acid suspension giving bright yellow shades.

The alkaline solution treated with dimethyl sulphate yields a new body insoluble in alkali which also dyes cotton yellow from the vat.

*Example 3*

8 parts of the product of Example 1, 80 parts of anhydrous aluminium chloride, 16 parts of sodium chloride and 20 parts of acetyl chloride are mixed and heated to 180° C. for about 12 hours, while oxygen is bubbled through. The cooled mass is boiled with water and hydrochloric acid and then heated at 90° C. with bleach liquor. The product is a very bright orange powder resembling that of Example 2.

*Example 4*

8 parts of the product of Example 1, 80 parts of anhydrous aluminium chloride, 16 parts of sodium chloride and 20 parts of benzene sulphonyl chloride are mixed and heated at 180° C. for 12 hours, while oxygen is bubbled through. The cooled mass is boiled with water and hydrochloric acid and then heated to 90° C. with bleach liquor. The product in this case is orange brown in color and is insoluble in alkali and alkaline hydrosulphite.

As many apparently widely different embodiments of this invention may be made without departing from the spirit and scope thereof, it is to be understood that we do not limit ourselves to the specific embodiments thereof except as defined in the appended claims.

We claim:—

1. Process for the manufacture of valuable products comprising the condensation of an organic acid halide in presence of aluminum chloride with the product obtainable by the interaction of benzanthrone and formaldehyde in a sulphuric acid medium.

2. Process according to claim 1 followed by an oxidation treatment.

3. Process for the manufacture of valuable products comprising the condensation of an organic acid halide in presence of aluminum chloride with dibenzanthronylmethane.

4. Process for the manufacture of valuable products comprising the condensation of an aromatic acid halide in presence of aluminum chloride with the product of the interaction of benzanthrone and formaldehyde in a sulphuric acid medium.

5. Process according to claim 4 followed by an oxidation treatment.

6. Process according to claim 1 followed by an oxidation treatment and a treatment with an alkylating agent.

7. Process according to claim 1 followed by an oxidation treatment and a treatment with an acylating agent.

8. Process for the manufacture of valuable products comprising the condensation of an organic acid halide in presence of aluminum chloride with dibenzanthronylmethane, followed by an oxidation treatment with a hypochlorite.

9. Process according to claim 8 in which the organic acid halide used is benzoyl chloride.

10. Process according to claim 8 in which the organic acid halide used is acetyl chloride.

11. As a composition of matter the product obtainable by condensing an organic acid halide in presence of aluminum chloride with a dibenzanthronylmethane having the probable formula

wherein B represents a benzanthronyl radical and R is selected from the group consisting of hydrogen, alkyl and aryl.

12. As a composition of matter the product of unknown constitution obtainable by condensing benzoyl chloride in the presence of aluminium chloride with dibenzanthronylmethane.

13. As a composition of matter with the product of unknown constitution obtainable by condensing acetyl chloride in the presence of aluminium chloride with dibenzanthronylmethane.

In testimony whereof we affix our signatures.

DAVID CLARENCE RHYS JONES.
ROBERT FRASER THOMSON.
JOHN THOMAS.